United States Patent Office 2,861,070
Patented Nov. 18, 1958

2,861,070
PROCESS FOR THE PRODUCTION OF MONOPHENYLMELAMINE

Leo E. Rademacher, Longmeadow, Mass., assignor to Monsanto Chemical Company, St. Louis, Mo., a corporation of Delaware No Drawing. Application August 8, 1956
Serial No. 602,927

3 Claims. (Cl. 260—249.6)

The present invention relates to monophenylmelamine and more particularly to an improved process for its production.

Monophenylmelamine (2-anilino - 4,6 - diamino-s-triazine) is useful as an aminoplast in the preparation of surface coating resins and as an intermediate in the preparation of various other types of synthetic resins. It is well known that monophenylmelamine can be prepared by the reaction of 2,4-diamino-6-chloro-s-triazine with aniline in aqueous medium followed by neutralization to convert the monophenylmelamine hydrochloride to the free base. This method is generally satisfactory. However, it has been observed that when the monophenylmelamine so produced is resinified by reaction with formaldehyde, for example, the resulting resin is characterized by an undesirable color ranging from pink or lavender to dark brown which makes it unsuitable in many common applications. Frequently, the color may be visually observed in the monophenylmelamine monomer itself, but even when the discoloration is not readily apparent to the naked eye, color bodies are present in the monomer which are so intensified in the resinification process that the resulting resin is unacceptable because of its high color.

We have now discovered that monophenylmelamine suitable for preparing resins of a satisfactory color and for other uses in which color of the final product is important can be prepared and used without additional purification if certain modifications are made in the process as practiced in the prior art. Briefly, this invention involves the use of a protective inert atmosphere during the reaction to prevent the formation of the substance or substances which are responsible for the objectionable color in the substituted melamine.

According to a specific embodiment of the invention, the 2,4-diamino-6-chloro-s-triazine, water, and aniline are slurried together and heated to 95–105° C. under a protective atmosphere of nitrogen or some other inert gas. The reaction mixture is maintained in this temperature range for 0.5 to 4.0 hours under the inert atmosphere and then filtered while hot, cooled to 25–35° C., and neutralized with a strong base. The precipitated monophenylmelamine is recovered by filtration and thoroughly washed with water. It is then ready for use or may be dried if desired.

The invention is illustrated by the following examples in which all parts given are by weight. However, these are not to be construed as limiting in any manner except as it is limited in the appended claims.

Example 1

A one-liter, three-necked flask was fitted with a stirrer, a reflux condenser, a thermometer, and a gas inlet tube of sufficient length so as to extend about ½ inch below the surface of the liquid. Four hundred parts of water, 50.0 parts (0.344 mole) of 2,4-diamino-6-chloro-s-triazine and 32.88 parts (0.353 mole) of aniline were charged to the flask. Dry nitrogen was passed into the flask at a rate of about 3 liters per hour. The mixture was heated to reflux temperature over a 35-minute period and maintained under reflux conditions for about 3 hours. The solution was filtered while hot and the filtrate was cooled to 30° C. While the filtrate solution was stirred vigorously, a 5% aqueous solution of sodium hydroxide was slowly added to it until the pH rose to 10.4. This required 270 ml. of sodium hydroxide. The monophenylmelamine precipitated was filtered off and washed by slurrying it first with 500 ml. of 1% aqueous sodium hydroxide, draining, and reslurrying with 500 ml. of water. The white product was then dried at 100° C. for 18 hours to yield 63.0 parts (90.7%) of the dry material.

This monophenylmelamine was used in formulating a surface coating resin as follows:

Approximately 50 parts of the monophenylmelamine (0.25 mole), 101 parts of a 37% aqueous formaldehyde solution (1.25 moles of formaldehyde), 100 parts of n-butanol (1.33 moles), and 50 parts of water (2.8 moles) were charged to a 500 ml., 3-necked Pyrex flask equipped with a stirrer, a thermometer, and a reflux condenser. Enough of a 5% aqueous solution of sodium hydroxide was added to produce a pH of 8.5–9.0 and the mixture was heated while it was continuously stirred until it began refluxing. The mixture was maintained under reflux conditions for about 30 minutes after which the pH was adjusted to about 5.5 by the addition of 10% aqueous oxalic acid. Water was then removed from the mixture by azeotropic distillation for a period of from 2–3 hours. The remaining mixture was distilled at atmospheric pressure to an endpoint temperature of 105° C. Thereafter, butanol was removed by vacuum distillation at 100 mm. pressure to yield a resin having from 65–70% total solids. The resin was diluted with xylol to a solids content of about 60% and filtered using a filter aid. The resin thus obtained did not have any pink or lavender coloration.

Example 2

The entire procedure of Example 1 was repeated except that no nitrogen was used, the reaction mixture being exposed to air. The resin produced from monophenylmelamine made under these conditions was a light lavender color.

Example 3

In view of the observation that a wet cake of 2,4-diamino-6-chloro-s-triazine occludes an appreciable quantity of oxygen, the procedure of Example 1 was modified slightly to insure the exclusion of all oxygen from the reaction. The 400 parts of water and 50.0 parts of 2,4-diamino-6-chloro-s-triazine were charged to the same reaction flask used in Example 1. The slurry was heated to reflux and refluxed for 10 minutes at a pressure of 100 mm. of Hg. As the vacuum was broken preparatory to charging the aniline, the system was thoroughly flushed with nitrogen to carefully exclude any air and the aniline (0.353 mole) was then added to the flask. The reaction mixture was then heated to reflux temperature and maintained under reflux conditions for about 3 hours while dry nitrogen was continuously passed into the flask at a rate of about 3 liters per hour to maintain an inert atmosphere throughout the reaction period.

The solution was filtered while hot and the filtrate was cooled to 30° C. The filtrate was neutralized and the precipitated monophenylmelamine was recovered exactly as described in Example 1 and in comparable yield.

The resin produced with this monophenylmelamine according to the same formulation described in Example 1 had no objectionable pink or lavender coloration.

It is to be understood that this invention is not limited to the particular conditions given in the examples. For example, in addition to nitrogen, other gases which may be used to prevent contact of the reaction mixture with oxygen or air are carbon dioxide, hydrogen, argon and the other inert gases, or hydrocarbons which are inert to the reactants under the reaction conditions such as methane, ethane, hexane, and the like.

The use of equimolar proportions of aniline and the chlorotriazine is preferred. An excess of one or the other of the reactants can be employed but appears to offer no particular advantage. An amount of water sufficient to maintain the monophenylmelamine hydrochloride formed in solution or to keep the reaction mixture in a sufficiently fluid state to permit easy filtering should be employed for optimum efficiency in operation. About 88 moles of water per mole of aniline or chlorotriazine is the minimum amount required and amounts from the minimum up to 175 moles per mole of either reactant are usually preferred. Larger quantities can be used but tend to be undesirable from a practical standpoint since the water must subsequently be removed and this lengthens process time needlessly.

Formation of the aryl-substituted melamine occurs readily at temperatures from 50° C. upwards. Preferred temperatures are those in the range from 95 to 105° C., although higher temperatures requiring the use of pressure may be employed if desired. A minimum reaction period of 2–3 hours is required to effect complete reaction and secure maximum yields.

Neutralization and precipitation of the monophenylmelamine hydrochloride from solution can be accomplished by using any of the alkali-metal hydroxides although sodium hydroxide is the preferred base. The temperature at which this reaction is carried out may be varied but best results are obtained at a temperature below 35° C. since at higher temperatures the monophenylmelamine has a tendency to "oil out." Enough of the hydroxide is added to bring the pH of the reaction mixture in the range between 9.5 and 11 and preferably to maintain it at about 10.5.

The precipitated monophenylmelamine can be recovered by any convenient method. Preferably, it is recovered by filtration or centrifugation and then washed and dried.

What is claimed is:

1. In the process for the production of monophenylmelamine wherein 2,4-diamino-6-chloro-s-triazine and aniline are reacted in aqueous medium and the monophenylmelamine hydrochloride formed is subsequently neutralized with an alkali metal hydroxide to obtain the monophenylmelamine, the improvement which comprises conducting the reaction of 2,4-diamino-6-chloro-s-triazine and aniline under an atmosphere of an inert gas chosen from the group consisting of nitrogen, carbon dioxide, hydrogen, argon, methane, ethane, and hexane.

2. In the process for the production of monophenylmelamine wherein 2,4-diamino-6-chloro-s-triazine and aniline are reacted in aqueous medium and the monophenylmelamine hydrochloride formed is subsequently neutralized with an alkali metal hydroxide to obtain the monophenylmelamine, the improvement which comprises conducting the reaction of 2,4-diamino-6-chloro-s-triazine and aniline under an atmosphere consisting of nitrogen.

3. In a process for the production of monophenylmelamine wherein 2,4-diamino-6-chloro-s-triazine and aniline are reacted in aqueous medium and the monophenylmelamine hydrochloride formed is subsequently neutralized with an alkali metal hydroxide to obtain the monophenylmelamine, the improvement which comprises refluxing the 2,4-diamino-6-chloro-s-triazine and water under vacuum to remove air, adding the aniline to the resulting degassed slurry while simultaneously purging the system with substantially pure nitrogen, and thereafter conducting the reaction of 2,4-diamino-6-chloro-s-triazine and aniline under an atmosphere consisting of nitrogen.

References Cited in the file of this patent

UNITED STATES PATENTS 2,448,338   Widmer _____ Aug. 31, 1948

OTHER REFERENCES

Walker et al.: J. Am. Pharm. Assoc., vol. 39, pages 393–396 (1950).

Banks: J. Am. Chem. Soc., vol. 66, pages 1127–1130 (1944).

Banks et al.: J. Am. Chem. Soc., vol. 66, pages 1771–1775 (1944).